United States Patent [19]

Hebert

[11] 4,175,668
[45] Nov. 27, 1979

[54] REUSABLE STOPPER FOR SEALING CONTAINERS PROVIDED WITH A BEADED NECK SUCH AS BOTTLES

[76] Inventor: Jean-Claude Hebert, 34-36 rue de General Leclerc, 51200 Epernay, France

[21] Appl. No.: 911,943

[22] Filed: Jun. 2, 1978

[51] Int. Cl.² .............................................. B65D 45/04
[52] U.S. Cl. .................................... 215/354; 215/364
[58] Field of Search ................ 215/293, 316, 364, 354

[56] References Cited

U.S. PATENT DOCUMENTS 1,324,256  12/1919  Langan ................................. 215/293
1,951,559  3/1934   Pyott .................................... 215/316
3,128,896  4/1964   Schnier ................................ 215/364

FOREIGN PATENT DOCUMENTS 2132505  11/1972  France ..................................... 215/316
808600   2/1959   United Kingdom ..................... 215/293

Primary Examiner—Donald F. Norton
Attorney, Agent, or Firm—O'Brien and Marks

[57] ABSTRACT

A device for sealing containers, such as bottles with a beaded neck, is disclosed in the form of a cap having articulated straps provided with projecting jaws adapted to engage the cap below the head of the bottle.

5 Claims, 2 Drawing Figures

REUSABLE STOPPER FOR SEALING CONTAINERS PROVIDED WITH A BEADED NECK SUCH AS BOTTLES

The invention relates to a sealing device intended in particular for fluid-tight stoppering of containers provided with a neck provided with an annular bead, such as bottles, particularly those intended to contain carbonated beverages whose freshness and sparkling effect it is desired to conserve.

It is often necessary, particularly in the case of opened champagne bottles, to resort, to prevent loss of the gases and tasty qualities of the wine, to removable stopper devices that seal, in a fluid-tight manner, the neck of the bottle to conserve the remainder of the beverage contained in the bottle for several days without denaturing.

Of the existing devices, there is known particularly French Patent No. 2,132,505 of Apr. 5, 1971 in the name of the applicant, a stopper made up of a body in the shape of a cap in which is mounted an axially mobile cup subjected to the action of a calibrated resisting spring, this cup being held in the cap by inward bending of the edge of the side wall of said cap, a second cup, smaller in diameter, exterior to the cap, being connected by welding to the first cap, the two cups holding between themselves a flexible fluid-tight ring that comes to rest on the edge of the container neck when the stopper is operational. Locking of the stopper on the container is performed, in this embodiment, with the aid of two hooped straps provided with clamps and connected to the cap, said straps being able to be pinched on the container neck so that their clamps fasten under the annular bead.

This type of stopper is an embodiment that is not very efficient and of doubtful reliability. Mounting and positioning of the spring in relation to the cup inside the cap and in relation to the cap properly so-called are difficult to perform because the spring is masked in the cap. Further, after being used several times, the spring often gets off center or turns sideways thus jamming the cup. Finally, it has been noted that this spring has a tendency, after several days of application of the stopper on a bottle and because of the permanent compression to which it is subjected, gradually to slacken so that the fluid tightness is less and less assured as the "fatigue" of the spring increases. Thus, often a beverage that was initially carbonated becomes flat after sitting several days in a bottle equipped with such a stopper.

The invention is intended to remedy these drawbacks and for this purpose, relates to a stopper device which, while harkening back to the one described above, is designed much differently not to exhibit the fabrication and utilization drawbacks mentioned above.

The invention therefore relates to a device for sealing containers provided with a neck having an annular bead, a device of the type made up of a body in the form of a cap whose lateral wall holds a stopping and fluid tightness organ, said cap comprising a pair of articulated straps provided with projecting jaws able to engage below the neck bead of the container, a device characterized in that the fluid tightness organ is made up of a plug of elastic, deformable material made up of a head extended downwards by a recessed annular skirt, this head being housed in the cap body and being held on the inside of this body by clamps bent under the base of the head, only the annular skirt projecting on the outside of the cap to penetrate into the neck of the container.

According to a preferred embodiment, the plug is formed by a slightly truncated head, circular in section, hollowed out in its center, the annular skirt of this plug, located back from the head, defining a peripheral shoulder in relation to the head.

According to a characteristic of the invention, the annular skirt of the stopper plug is then and elastically deformable in a radial plane to fit the inside wall of the container neck.

A stopper device according to the invention is shown, by way of non-limiting example, in the accompanying drawings, in which.

Figure 1:
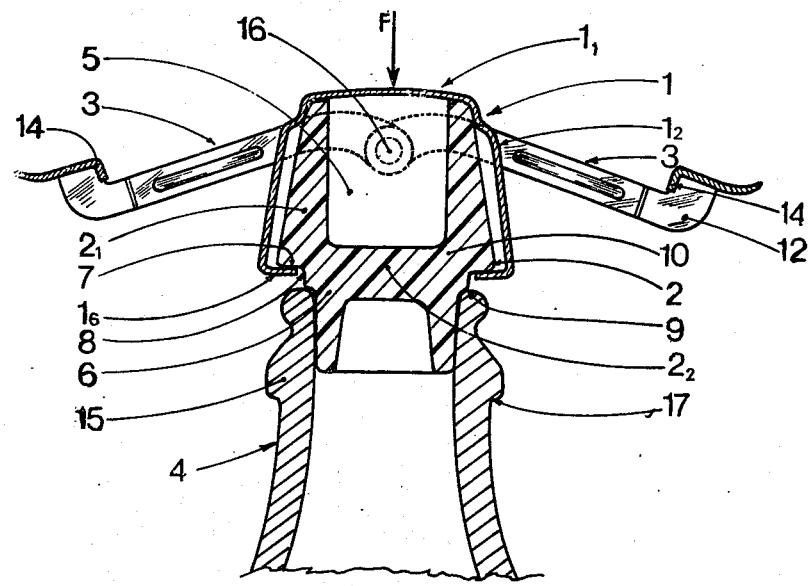
FIG. 1 is a view in axial section of the stopper device according to the invention put on the neck of a bottle.

The stopper device can be suitable for sealing any container comprising a narrow neck provided exteriorly with at least a hooking bead.

This device is made up essentially of three parts, on the one hand an outside cap 1, on the other hand a stopper and fluid tightness plug 2 and, finally, a pair of straps 3 intended to hold the device on neck 4 of a bottle.

Cap 1 is obtained by cutting a blank from a metal sheet, this blank then being stamped to constitute bottom $1_1$ and a peripheral lateral wall $1_2$. Edge $1_3$ of the blank is (FIG. 2) notched to form crimping clamps $1_3$.

This cap serves as the casing for the plug properly so-called, which is made by molding an elastic, deformable synthetic material such as styrenebutadiene base thermoplastic rubber.

This plug is made up of a head $2_1$ provided with a deep cavity 5 giving this head a great flexibility. Bottom wall $2_2$ of the plug head is extended downward by an annular skirt 6 with a diameter less than that of head $2_1$ of the plug, so that this skirt defines, in relation to head $2_1$, a peripheral shoulder 7 on which are bent clamps $1_3$ extending lateral wall $1_2$ of cap 1. This annular skirt 6 is connected to peripheral shoulder 7 by a circular collar 8 intended to rest on the upper end of the container neck when the annular skirt is engaged in this neck. Collar 8 has a height broadly greater than the thickness of clamps $1_3$ of the cap so that these latter do not come in contact with the upper edge 9 of the container neck when the stopper device is locked by the set of straps 3. Actually, such a contact would work against the effectiveness of the plug, the straps drawing on the hard part of the cap and no longer working with the characteristics of flexibility and deformation of the material constituting the plug.

In this regard, it should be noted that wall 10 of the plug, located opposite collar 8, is much thinner than the base of the plug head so as to favor, at this level, the partial deformation of said plug, and in particular a better penetration of the annular skirt in the container neck when straps 3 are clamped.

Figure 2:
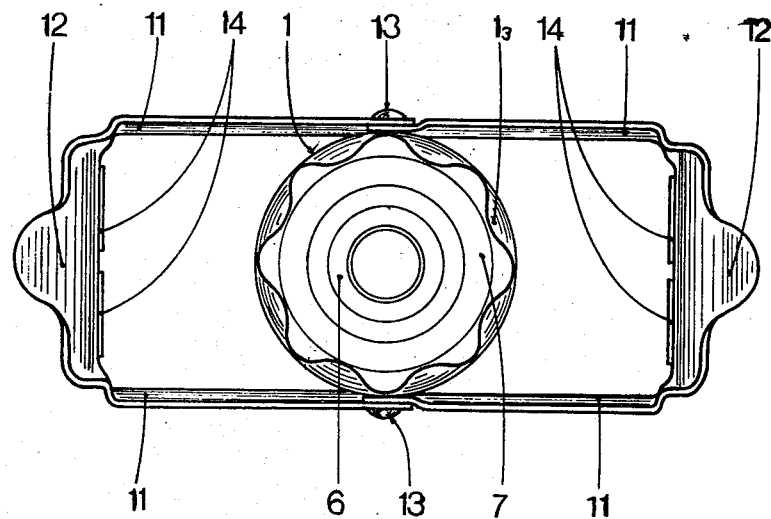
FIG. 2 is a bottom view of the device according to the invention.

These straps 3 are, as shown in FIG. 2, made of arms 11 connected together by a hoop 12, these arms being respectively articulated on pivots 13 by diametrically opposite rivets going through the wall of cap 1.

These straps comprise clamps or jaws 14 (FIGS. 1 and 2) intended to engage under annular bead 15 of the container neck to lock the plug on said neck.

The length of the straps is slightly less than the height between their axis of rotation 16 and shoulder 17 of the head of the container neck, so that their hooking onto this head should be preceded by a pressure force applied on the device cap. This axial pressure exerted in the direction of the bottle (arrow F, FIG. 1) has the effect of compressing the material making up plug 2, so as slightly to reduce its height to permit hooking of the straps on bead 15. When this pressure is released, the flexible material acts like a spring, which assures a good locking of the straps and prevents their untimely opening.

If this plug is intended for stoppering bottles containing carbonated beverages, the gases coming from the fermentation of the liquid will have a tendency to rise in the neck of the bottle and apply annular skirt 6 radially and outwardly, so that the skirt will firmly fit the inside wall of the container neck and thus resist any loss of the gases.

This device is simple to make since the plug is molded and simply housed and held in cap 1 by bending of clamps 1₃ on peripheral shoulder 7.

Further, this device is particularly effective since the elasticity of the material constituting the plug has a compression effect quite similar to a coil spring while suffering fatigue less rapidly so that the fluid tightness effect is maintained as long as desired.

Inasmuch as the present invention is subject to many modifications, variations and changes in detail, it is intended that all material in the foregoing description or accompanying drawings be interpreted as illustrative and not in a limiting sense.

What is claimed is:

1. In a reusable stopper for a container having a neck with an annular bead,
    a hollow metal cap having a crimping means,
    a one-piece circular deformable body composed of an integral head, collar and skirt,
    said head secured within said cap by said crimping means,
    the collar disposed between the head and the skirt and having a diameter intermediate the diameter of the head and the skirt but greater than the inner diameter of the container neck,
    said skirt having an outer diameter adapted to fit within the container neck and which diameter is less than the diameter of the collar,
    the head being generally cup-shaped and open at the top,
    the collar depending from the bottom wall of the head and being long enough to prevent the metal cap from contacting the container neck,
    a pair of straps pivotally secured to the cap and having arms and having projecting jaws at the ends of the arms to engage the annular bead of the container neck when the skirt is inserted into the container neck.

2. The stopper of claim 1 wherein the bottom wall of the cup-shaped head is smaller in diameter than the side wall of the head.

3. The stopper of claim 1 wherein the body is made of synthetic material compatible with food products.

4. The stopper of claim 3 wherein the synthetic material is a styrene-butadiene rubber.

5. The stopper of claim 4 wherein the arms are of a length sufficient to deform and compress the material of the head when the jaws engage the bead whereby to bring the collar into fluidtight seal against the end of the container neck.

* * * * *